P. A. BANCEL.
REGENERATIVE POWER INSTALLATION.
APPLICATION FILED AUG. 21, 1918.

1,353,706. Patented Sept. 21, 1920.
2 SHEETS—SHEET 1.

INVENTOR
Paul A. Bancel
BY
Joseph N. Schofield
ATTORNEY

P. A. BANCEL.
REGENERATIVE POWER INSTALLATION.
APPLICATION FILED AUG. 21, 1918.
1,353,706.
Patented Sept. 21, 1920.
2 SHEETS—SHEET 2.
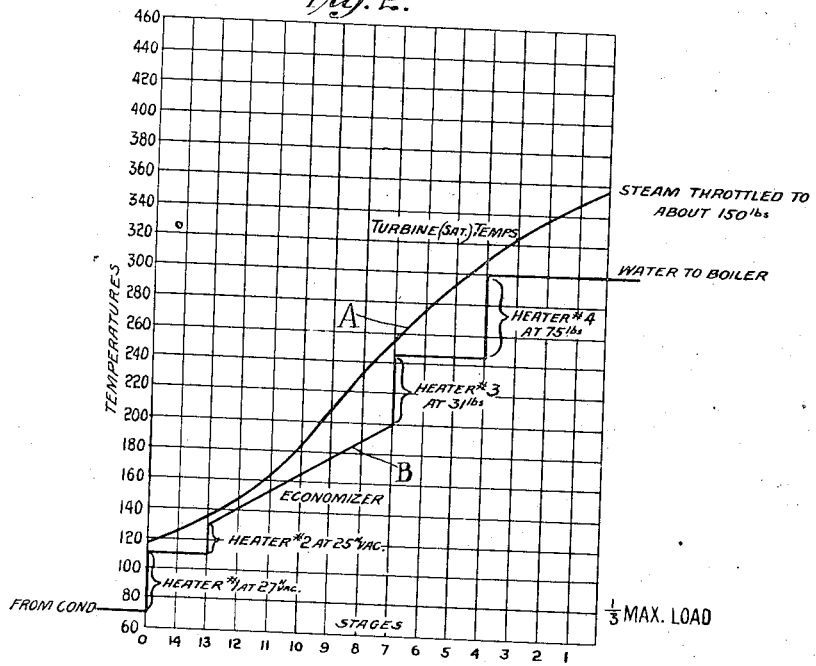
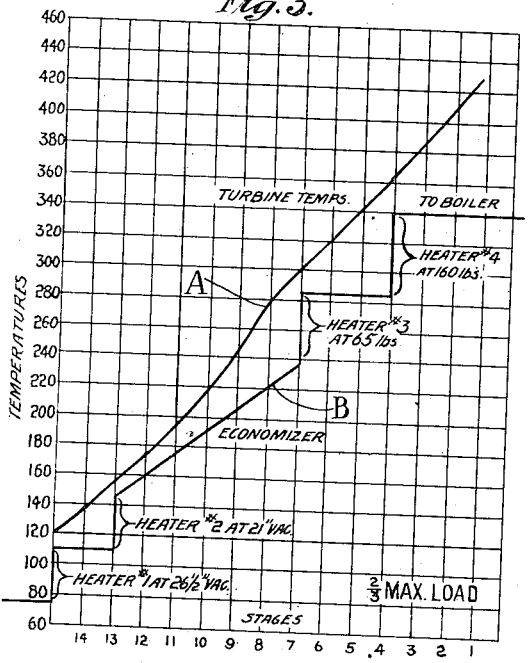
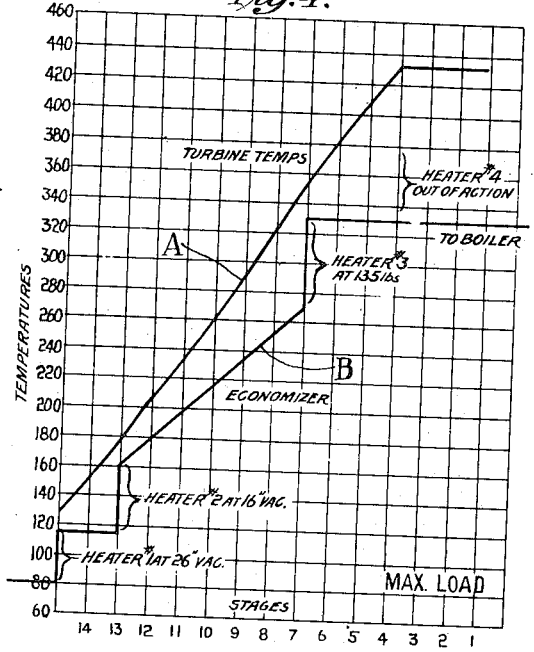
INVENTOR
Paul A. Bancel
BY Joseph K. Schofield
ATTORNEY

UNITED STATES PATENT OFFICE.

PAUL A. BANCEL, OF NUTLEY, NEW JERSEY, ASSIGNOR TO THE INGERSOLL-RAND COMPANY, JERSEY CITY, NEW JERSEY, A CORPORATION OF NEW JERSEY.

REGENERATIVE POWER INSTALLATION.

1,353,706.

Specification of Letters Patent.  Patented Sept. 21, 1920.

Application filed August 21, 1918.  Serial No. 250,812.

*To all whom it may concern:*

Be it known that I, PAUL A. BANCEL, a citizen of the United States, residing at Nutley, in the county of Essex and State of New Jersey, have invented a certain new and useful Improvement in Regenerative Power Installations, of which the following is a specification.

This invention relates to power installations and especially to a turbine installation in which the steam after having passed through the turbine is condensed and the water of condensation then reheated through a series of heaters to be utilized over again.

The objects of the present invention are to provide an efficient installation of turbine for a complete land or marine power equipment in which the condensate from a main unit is utilized as circulating water in a condenser for an auxiliary unit and then reheated progressively and returned as feed water to the boilers. Further, to utilize steam from different stages of an auxiliary turbine for the feed water heaters which will be at different temperatures as well as pressures. The first reheater is adapted to be supplied with steam from the final or exhaust stage of the auxiliary turbine thus acting as a condenser in which the steam from the auxiliary unit is condensed.

In general, turbine installations have been provided which comprise a single large turbine designed to provide sufficient power to operate all necessary auxiliaries as well as the outside load it is expected to carry. The auxiliaries in these installations are provided with and operated by electric motors supplied with current from the generator coupled to the main turbine. These installations do not provide any way of heating the condensate from the turbine and if readmitted directly to the boilers at the low residual temperature of the condensate would result in a loss of efficiency. To avoid this economizers are used, but the heat available with modern efficient stoking and boilers is relatively small and the range of water temperature large under modern conditions of high vacuum which means low condensate temperature and high boiler pressure which means high boiling temperature.

Thus, whereas the economizer can efficiently heat the water 100 to 150 degrees, the range of heating desired is approximately 350 degrees.

To further heat the water a system has been employed in a few stationary, and, it is believed, marine plants, consisting of a small auxiliary turbine driving a generator which supplies power to the auxiliaries. The exhaust from the small turbine is condensed at partial vacuum or in other cases at atmospheric pressure in a condensing chamber or heater, where it gives up its heat to the feed water which is then fed to the economizers or boilers direct.

In the present installation provision is made for the generation of power for auxiliaries and other purposes by a small turbine of the extraction type. The auxiliary turbine which may have 10 to 15 per cent. of the power of the main unit has steam extracted or bled from various stages for the purpose of heating the condensate of the main turbine in successive steps. A plurality of heaters is provided, the first one taking steam from the discharge of the last stage of the auxiliary turbine and designed to maintain a vacuum of about 26 inches or 27 inches when the vacuum in the main condenser is 29 inches and the condensate at relatively low temperature. Subsequent reheaters taking steam from the auxiliary turbine unit at higher stages gradually reheat the feed water until it approximates the temperature of the steam in the inlet of the auxiliary turbine or at about the temperature of the steam as it comes from the boiler. The steam supplied the first and second reheaters from the auxiliary turbine is at pressures below atmospheric, namely, about 26 inches and 21 inches, respectively, the air, non-condensables being exhausted from these reheaters by any convenient means such as a steam jet vacuum pump exhausting into an open tank, or else the air can be conducted to the main condenser or main vacuum pump. The feed water passing through these low pressure reheaters is discharged into an open tank from which the water is withdrawn by a suitable pump to an economizer through which pass the products of combustion of the boiler furnaces. The effect of the two low pressure reheaters is to raise the temperature of the water to about 145 degrees F., at which temperature it is admitted to the open tank. It is well known that the most desirable temperature of feed to an economizer is from about 100 to 150 degrees F. to avoid "sweating" and corrosion of tubes.

The economizer increases the water temperature by 100 to 150 degrees depending upon the boiler load, the heating range being larger the heavier the load, this being a well known characteristic of economizer installations. From the economizer the feed water continues through a third and fourth reheater heated by means of steam from the higher stages of the auxiliary turbine at pressures above atmospheric and from the final reheater passes on its way to the boilers, having now been raised in temperature to approximately that of the water within the boilers.

In marine installations the load is practically constant while under way and the load on the auxiliaries is fairly constant also. This enables the installation to be designed to give the maximum efficiency at this load. In addition to this marine installations are not usually provided with an economizer and in place of an economizer the installation may be equipped with one or two additional heaters to give the same heating effect as would be provided by the economizer.

Referring now more particularly to the figures of the drawings,

Figs. 2, 3 and 4 show the estimated temperatures of the steam and feed water in different parts of the installation under different conditions of load.

Figure 1:
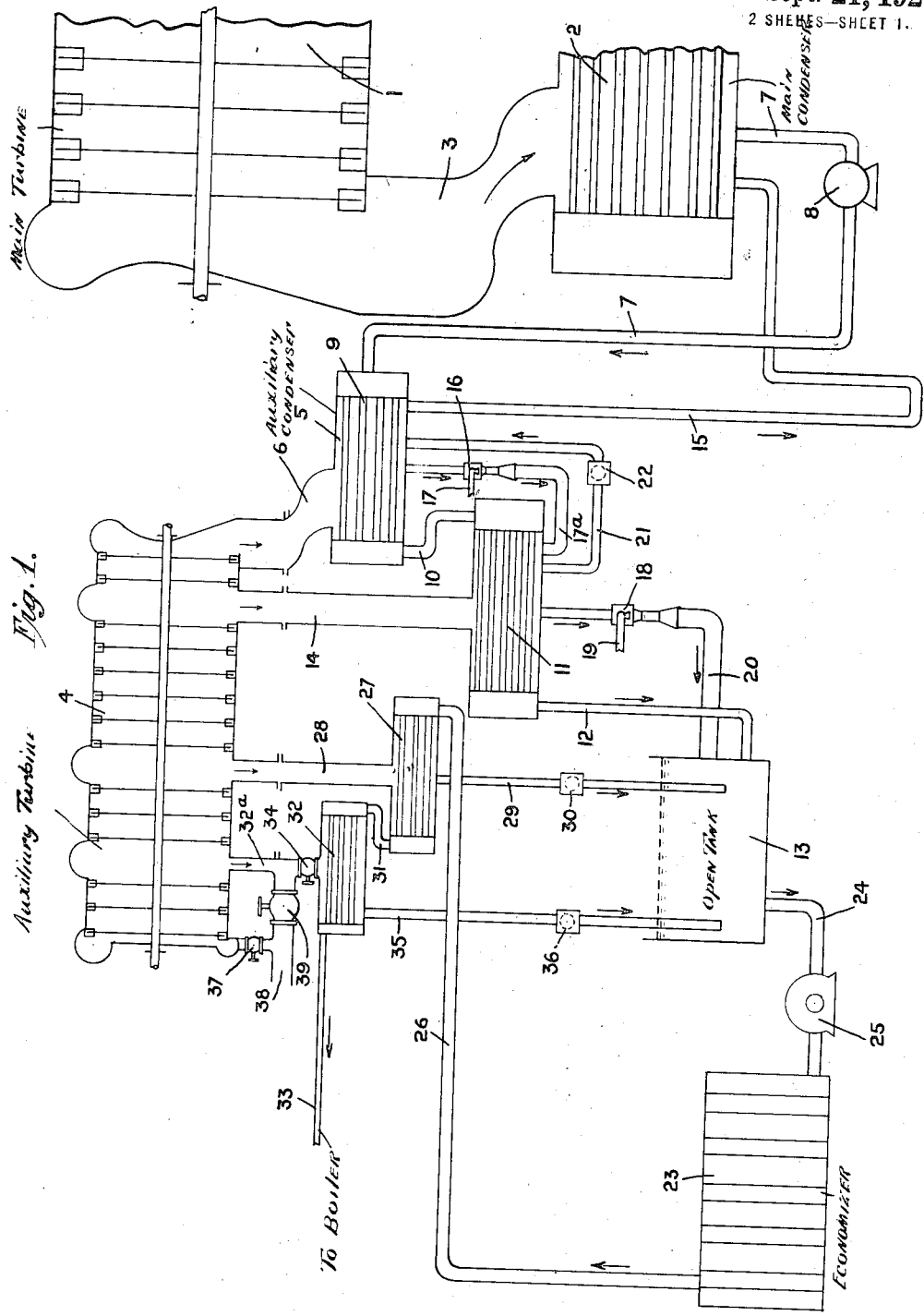
Figure 1 shows a diagrammatic view of one form of the complete installation.

In Fig. 1 the main turbine is shown at 1 which is connected to its condenser 2 which in the form best adapted to the present invention is of the surface type, by means of an exhaust passage 3. The auxiliary turbine, utilized for driving the auxiliaries necessary for the complete installation is shown at 4, and is connected to its condenser 5, which is also of the surface type, by exhaust passage 6. The condensate condensed by the main condenser 2 is forced through a passage 7 by means of a circulating pump 8 into the tubes 9 of condenser 5 thus serving to condense the steam from the auxiliary turbine 4, the water during its passage through condenser 5 being raised in temperature. From the condenser 5 the circulating water passes through passage 10 to a reheater 11 and from thence through passage 12 to an open feed water tank 13, the water being still further raised in temperature. Reheater 11 is connected by means of passage 14 with one of the lower stages of the auxiliary turbine 4 by means of which steam at a pressure below atmospheric is led from this turbine 4 to maintain the reheater 11 at approximately the temperature of 145 degrees. The vacuum maintained in condenser 5 is relatively low, being about 26 or 27 inches, somewhat lower than vacuum in condenser 2, which is designed for operation at the very highest possible vacuum, i. e., about 29 inches.

Passage 15 extending from condenser 5 to condenser 2 permits the steam condensed in condenser 5 to flow into condenser 2 thus adding slightly to the amount of condensate to be reheated. No pump is required to move this water, the difference in pressure between the two condensers being sufficient. A steam jet vacuum pump 16 is connected to the condenser 5, being supplied with steam at a high pressure through the tube 17 to exhaust the air and non-condensables from this condenser into the reheater 11, through passage 17ª from which the air and non-condensables are driven, by means of steam jet air pump 18 having its steam supply shown at 19, into the open tank 13 through passages 20. A passage 21 also connects condenser 5 and reheater 11, which is provided with a trap 22 to allow any water condensed in reheater 11 to flow into the condenser 5 and thence into the main condenser 2.

An economizer is shown at 23 and has connections (not shown) with the boilers to permit the products of combustion from the boilers to pass through the economizer and is also provided with water passages through which the circulating water passes coming in proximity to the hot gases of combustion. As above stated, the economizer 23 receives the circulating water from the open tank 13 at about 145 degrees. Passage 24 extends from the open tank 13 and is provided with a circulating pump 25 by means of which water from the tank may be forced through the economizer 23, then forced outwardly through passage 26 into a third reheater 27 at a greatly increased temperature. The action of the economizer varies under varied conditions of loads; that is, when the load is light the heating effect of the economizer is less owing to the fact that the amount of gases of combustion given off by the boilers is greatly reduced, while under conditions of heavier load the heating effect of the economizer is greatly increased. The reheater 27, which is the third of the series, is furnished with steam at relatively high temperature and pressure from an intermediate stage of the turbine 4 through a passage 28, and a passage 29 is provided having a trap 30 which will permit any steam which may be condensed in this reheater to flow into the open tank 13. From the third reheater 27 the water which has now been raised to approximately 285 degrees is led through passage 31 into a fourth reheater 32 which is supplied with steam at a still higher temperature and pressure from a higher pressure stage of the turbine 4 through passage 32ª. From the reheater 32 the water which has now been raised to approximately boiler temperature of about 340 degrees is led to the boilers as feed water through passages 33.

For conditions of very heavy load on the auxiliary turbine 4 a valve 39 is provided in the steam passage 38 to admit steam to an intermittent stage and a valve 34 is provided to shut off the supply of steam to heater 32 when valve 39 is open as under conditions of heavy load the temperature rise in the economizer 23 is greatly increased and reheater 32 is unnecessary. This reheater 32 is also provided with a passage 35 provided with a trap 36 to permit the steam condensed in this reheater to flow into the open tank 13. A valve 37 also provided in the steam passage 38 admits steam into the first or high pressure stage of the turbine during all conditions of load on the turbine 4.

Referring now to Fig. 2, this shows the temperature conditions at a relatively low load, the temperature curve of the steam to the turbine 4 being shown at A and the temperature rise in the feed water in its passage through the reheaters and economizer is shown at B. It will be noted that under these conditions the temperature rise within the economizer is approximately 70 degrees.

In Fig. 3, the temperature conditions in the installation is shown at about normal or two-thirds maximum load, the curve being slightly modified by the increased amount of condensate, due to the heavy load on the installation and the temperature rise in the economizer has been increased to about 100 degrees.

In Fig. 4 the temperature conditions are shown during maximum or overload conditions of the installation, the last reheater being disconnected and condensate admitted to the boiler directly from the third reheater at approximately the same temperature as in conditions of normal load shown in Fig. 3.

It will be noted in each of these figures that the temperature rise of the condensate in its passage through the economizer is about seventy degrees under conditions of low load and about one hundred and ten degrees in conditions of maximum or overload, thus indicating that the economizer is used at a high degree of efficiency.

From the above it will be seen that a power installation has been provided which will progressively reheat the condensate from a main condenser from a low temperature to approximately boiler temperature. Further, that an installation has been provided which will have a high over-all efficiency over a wide range of power output.

It is to be understood that the present showing and description disclose only one specific embodiment of the present invention, other forms and modifications are included within the spirit and scope of the invention, as expressed in the appended claims.

What I claim is:

1. In a power installation, a main power unit and condenser, an auxiliary power unit comprising a turbine, an auxiliary condenser for said turbine, a plurality of feed water heaters supplied with steam at different temperatures taken from different stages of said auxiliary power unit and means for passing the condensate from said main condenser through said auxiliary condenser and said heaters progressively so that the temperature of said condensate will be gradually raised in its passage through said heaters.

2. In a power installation, a main power unit and condenser, an auxiliary power unit utilizing steam at different pressures, an auxiliary condenser for said auxiliary power unit, a plurality of feed water heaters supplied with steam at different temperatures taken from different portions of said auxiliary power unit and means for passing the condensate from said main condenser through said auxiliary condenser and said heaters progressively so that the temperature of said condensate will be gradually raised in its passage through said heaters.

3. In a steam power installation, a main turbine, a condenser for the same, an auxiliary turbine and a condenser for said auxiliary turbine, the condensate from said main condenser being used as circulating water for said auxiliary condenser, means for progressively heating said condensate through a plurality of heaters after passing through said auxiliary condenser, said heaters being supplied with steam from different stages of said auxiliary turbine.

4. In a steam power installation, a main power unit and condenser, an auxiliary power unit comprising a turbine, a condenser for said auxiliary unit, means for passing the condensate from the main condenser through the auxiliary condenser as circulating water and then subsequently progressively heating said condensate to approximately boiler temperature.

5. In a steam power installation, a main power unit and condenser, an auxiliary power unit comprising a turbine, a condenser for said auxiliary unit, means for passing the condensate from the main condenser through the auxiliary condenser as circulating water and then subsequently passing said condensate through a plurality of heaters supplied with steam from progressively higher stages of said auxiliary turbine to heat said condensate to approximately boiler temperature.

6. In a steam power installation, a main power unit and condenser, an auxiliary power unit comprising a turbine, a condenser for said auxiliary unit, means for passing the condensate from the main condenser through the auxiliary condenser as circulating water and then subsequently passing said condensate through a plurality of heaters supplied with steam from different stages of said auxiliary turbine and also through an economizer supplied with heat from products of combustion.

7. In a steam power installation, a main turbine, a condenser for the same, an auxiliary turbine and a condenser for said auxiliary turbine, means for passing the condensate from said main condenser through said auxiliary condenser as circulating cooling water, and subsequently passing said condensate through a series of heaters to progressively heat said condensate to approximately boiler temperature.

8. In a steam power installation, a main turbine, a condenser for the same, an auxiliary turbine, and a condenser for said auxiliary turbine, means for passing the condensate from said main condenser through said auxiliary condenser as circulating cooling water and subsequently passing said condensate through a heater operating below atmosphere pressure, then into an open tank, then into an economizer and subsequently through a heater operating at a pressure above atmospheric.

9. In a steam power installation, a main turbine, a condenser for the same, an auxiliary turbine and a condenser for said auxiliary turbine, means for passing the condensate from said main condenser through said auxiliary condenser as circulating cooling water and subsequently passing said condensate through a series of heaters to progressively heat said condensate to approximately boiler temperature, said heaters being supplied with steam from progressively higher stages of said auxiliary turbine.

10. In a steam power installation, a main turbine, a condenser for the same, an auxiliary turbine and a condenser for said auxiliary turbine, means for passing the condensate from said main condenser through said auxiliary condenser as circulating cooling water and subsequently passing said condensate through a heater operating below atmospheric pressure, then into an open tank, then into an economizer and subsequently through a heater operating at a pressure above atmospheric, said heater being supplied with steam from progressively higher stages of said auxiliary turbine.

11. In a steam power installation, a main turbine, a condenser for the same, an auxiliary turbine and a condenser for said auxiliary turbine, means for passing the condensate from said main condenser through said auxiliary condenser as circulating cooling water then passing said condensate through a heater supplied with steam from one of the lower stages of the auxiliary turbine, then through an economizer and subsequently through another heater supplied with steam from a higher stage of the auxiliary turbine, whereby the temperature of said condensate is gradually raised to approximately boiler temperature.

12. In a steam power installation, a main turbine, a condenser for the same, an auxiliary extraction turbine having steam outlets from a plurality of different stages, a condenser for said auxiliary turbine, means for passing the condensate from said main condenser through said auxiliary condenser as circulating cooling water and subsequently passing said condensate through a heater supplied with steam from one of the lower stages of said auxiliary turbine, then through an economizer heated by exhaust gases and finally through a heater supplied with steam from one of the higher stages of said auxiliary turbine whereby said condensate is progressively heated to approximately boiler temperature.

13. In a steam power installation, a main turbine, a condenser for the same, an auxiliary turbine and a condenser for said auxiliary turbine, the condensate from said main condenser being used as circulating cooling water for said auxiliary condenser, means for progressively heating said condensate through a plurality of heaters after passing through said auxiliary condenser, said heaters being supplied with steam at different pressures and temperatures from the different stages of said auxiliary turbine, and air extracting means for removing the air and non-condensables from the heaters operating below atmospheric pressure.

14. In a steam power installation, a main turbine, a condenser for the same, an auxiliary turbine and a condenser for said auxiliary turbine, the condensate from said main condenser being used as circulating water for said auxiliary condenser, means for progressively heating said condensate through a plurality of heaters after passing through said auxiliary condenser, said heaters being supplied with steam at different pressures and temperatures from the different stages of said auxiliary turbine, and air extracting means comprising a steam jet air pump, for removing the air and non-condensables from the heaters operating below atmospheric pressure.

In testimony whereof, I have hereunto set my hand.

PAUL A. BANCEL.

It is hereby certified that the assignee in Letters Patent No. 1,353,706, granted September 21, 1920, upon the application of Paul A. Bancel, of Nutley, New Jersey, for an improvement in "Regenerative-Power Installations," was erroneously described and specified as "The Ingersoll-Rand Company," whereas said assignee should have been described and specified as *Ingersoll-Rand Company*, as shown by the records of assignments in this office; and that the said Letters Patent should be read with this correction therein that the same may conform to the record of the case in the Patent Office.

Signed and sealed this 30th day of November, A. D., 1920.

[SEAL.]

L. B. MANN,

*Acting Commissioner of Patents.*

Cl. 60—95.